United States Patent
Jain et al.

(10) Patent No.: US 11,960,818 B2
(45) Date of Patent: Apr. 16, 2024

(54) AUTOMATIC DETECTION AND REMOVAL OF TYPOGRAPHIC RIVERS IN ELECTRONIC DOCUMENTS

(71) Applicant: Adobe Inc., San Jose, CA (US)

(72) Inventors: Ashish Jain, Delhi (IN); Arushi Jain, Delhi (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 17/894,058

(22) Filed: Aug. 23, 2022

(65) Prior Publication Data

US 2024/0070376 A1 Feb. 29, 2024

(51) Int. Cl.
G06F 17/00 (2019.01)
G06F 40/109 (2020.01)
G06F 40/166 (2020.01)

(52) U.S. Cl.
CPC .......... G06F 40/109 (2020.01); G06F 40/166 (2020.01)

(58) Field of Classification Search
CPC .............................. G06F 40/109; G06F 40/166
See application file for complete search history.

(56) References Cited

U.S. PATENT DOCUMENTS

| | | | | |
|---|---|---|---|---|
| 7,770,111 B2* | 8/2010 | Burago | ................. | G06F 40/103 715/251 |
| 8,351,700 B2* | 1/2013 | D'Agostino | ....... | G06V 30/2268 382/179 |
| 8,996,994 B2* | 3/2015 | Alonichau | ............ | G06F 40/191 715/255 |
| 9,063,911 B2* | 6/2015 | Levy | ..................... | G06F 40/126 |
| 10,891,419 B2* | 1/2021 | Abou Mahmoud | .. | G06F 40/109 |
| 11,003,839 B1* | 5/2021 | Hatch | .................... | G06F 40/166 |
| 2004/0025118 A1* | 2/2004 | Renner | ................. | G06F 40/109 715/269 |
| 2012/0102394 A1* | 4/2012 | Nordback | ............. | G06F 40/103 715/247 |
| 2015/0324338 A1* | 11/2015 | Levy | ..................... | G06F 40/103 715/244 |
| 2022/0284169 A1* | 9/2022 | Jindal | .................... | G06F 40/109 |
| 2022/0405469 A1* | 12/2022 | Arora | .................... | G06F 40/109 |
| 2023/0281379 A1* | 9/2023 | Jain | ....................... | G06F 40/106 715/244 |

FOREIGN PATENT DOCUMENTS

WO WO-0142976 A1 * 6/2001 ............ G06F 17/211

* cited by examiner

*Primary Examiner* — Laurie A Ries
(74) *Attorney, Agent, or Firm* — Nicholson De Vos Webster & Elliott LLP

(57) ABSTRACT

Embodiments are disclosed for removing typographic rivers from electronic documents. The method may include receiving an electronic document including a plurality of words for automatic typographic correction. A typographic river is identified in the electronic document, the typographic river including a plurality of nodes, each node including an empty glyph. A candidate adjustment that removes the first node of the plurality of nodes is identified and the candidate adjustment is applied to the electronic document.

17 Claims, 8 Drawing Sheets

AUTOMATIC DETECTION AND REMOVAL OF TYPOGRAPHIC RIVERS IN ELECTRONIC DOCUMENTS

BACKGROUND

In electronic documents, typographic rivers are some of the most common perceptual errors that reduce document readability. A typographic river is a series of blank spaces in consecutive lines of an electronic document that disrupt the readability of the electronic document. However, removing typographic rivers are also some of the most labor-intensive tasks for editing electronic documents. The many options for modifying positions of various characters and typesetting values of characters to remove each node in a typographic river presents further challenges as some corrective actions change positions of character but do not remove the typographic river. The presence of typographic rivers in the electronic document degrade presentation quality of the electronic document and readability.

SUMMARY

Introduced here are techniques/technologies that relate to removing typographic rivers from electronic documents. In some embodiments, a typographic management system detects sequences of empty glyphs occurring in sequential lines in an electronic document. If these empty glyphs are determined to fall within a threshold distance of one another, they form a typographic river. The typographic rivers are removed by adjusting typographic parameters (e.g., hyphenation points or typesetting values such as glyph size, spacing, or other font parameters) of the paragraph to adjust the positions of the empty glyphs.

The typography management system provides an extensible solution that accommodates different languages, combinations of fonts within a document, or other embedded content such as images, graphics, or other types of content. This enables electronic documents to be processed in a scalable way that can be implemented for any type of document with any combination of text, images, or other content.

Additional features and advantages of exemplary embodiments of the present disclosure will be set forth in the description which follows, and in part will be obvious from the description, or may be learned by the practice of such exemplary embodiments.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
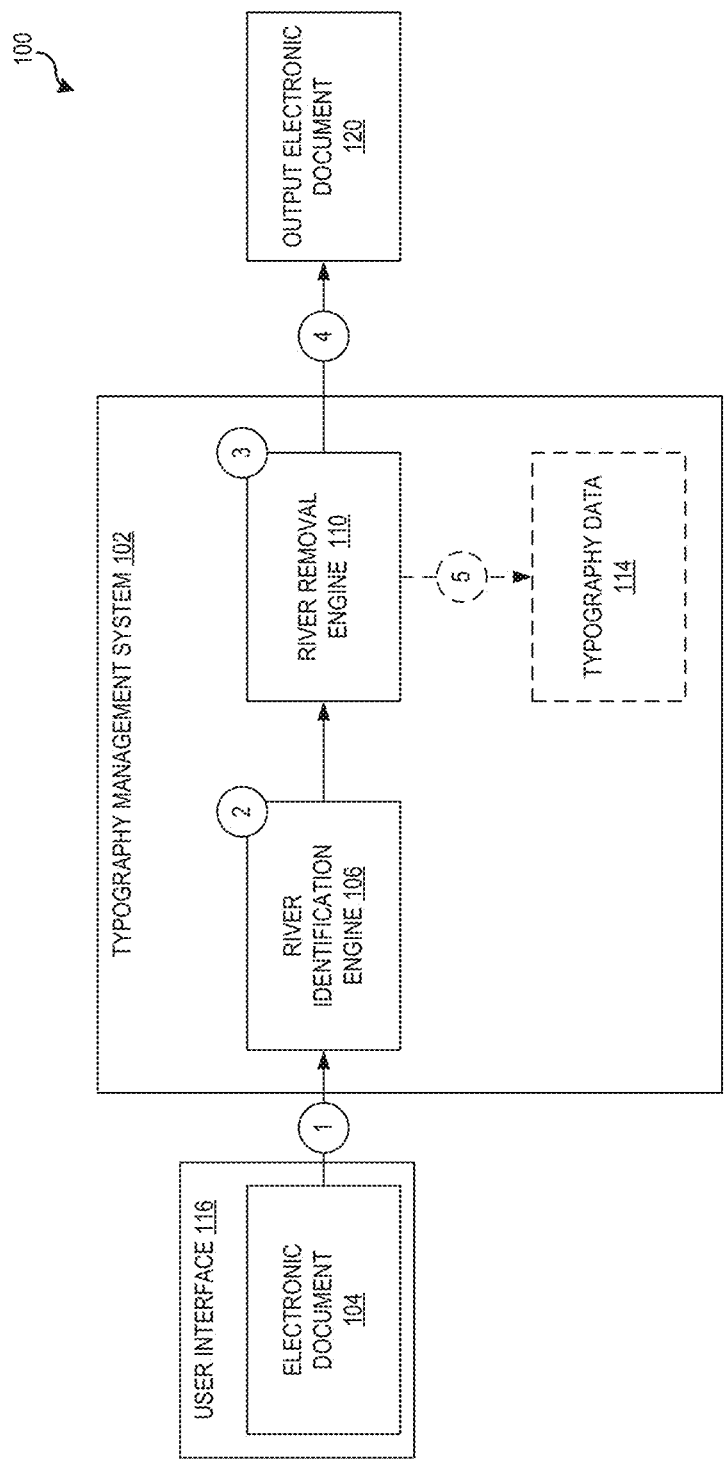
FIG. 1 illustrates a diagram of a process of detection and removal of typographic rivers in electronic documents in accordance with one or more embodiments.

One or more embodiments of the present disclosure includes a typography management system that corrects errors that are in an electronic document. A typographic river is a type of typography error that degrades presentation quality of the electronic document and readability. The typographic river is formed by a set of three or more consecutive lines that each include an empty glyph within a threshold distance. The threshold distance is measured along the line of text, such as a lateral distance between a point of a bounding box of a first empty glyph and a bounding box of a second empty glyph in a subsequent line. On a page, the typographic river creates an appearance of a line of blank space down the page that is distracting to the reader and makes the text on the page more difficult to read.

In one conventional approach to removing typographic rivers, a user manually inserts line breaks or spacing adjustments. However, this often leads to uneven spacing among the words. The uneven spacing between words causes poor paragraph justification which makes the appearance of the paragraph undesirable. Using this approach is also labor intensive, requiring manual detection of a typographic river and then iteratively applying a set of changes to various typography parameters in an attempt to remove each river. However, these settings require expertise and a skill level that is not accessible to an average user. Additionally, correcting one river may not eliminate other typographic rivers and in fact can create additional typographic rivers which require even more iterations of the manual process to remove. Particularly, in documents that have multiple pages, removing typographic rivers manually is not an adequate solution. Additionally, if any changes are made to the electronic document, the manual process may need to be repeated which further increases time and limits the flexibility of changes that can be made to the electronic document.

As discussed above, conventional techniques lack the ability to efficiently identify and remove typographic rivers. As a result, conventional systems require individually manipulating aspects of the electronic document in an attempt to remove the typographic river. This creates an inconsistent and laborious process that is not scalable or adaptable to any changes in the electronic document.

To address these and other deficiencies in conventional systems, embodiments perform detection and removal of typographic rivers in electronic documents by adjusting one or more parameters, such as hyphenation points or typesetting values. This creates a scalable system for removing multiple typographic rivers from electronic documents and provides a solution that can adapt to changes in the electronic document. Although embodiments are generally described with respect to text paragraphs in documents, embodiments may be used with mixed media including text, embedded images, or other content.

Embodiments automatically identify and remove typographic rivers from an electronic document. Automatic detection and removal of typographic rivers improves the visual appearance of the electronic document and is scalable to large documents to efficiently process corrective actions. Typically, a user would adjust multiple settings iteratively until a desirable output document is produced. However, these adjustments can be extremely challenging for long documents. By automatically detecting and removing typographic rivers, embodiments provide a solution for correcting typographic errors in electronic documents.

FIG. 1 illustrates a diagram of a process of detection and removal of typographic rivers in electronic documents in accordance with one or more embodiments. As depicted in FIG. 1, the typography management system 102 receives an electronic document 104 at numeral 1. The electronic document 104 may be received via a user interface 116. The electronic document 104 includes at least one typographic river. In an example, the electronic document 104 is any digital text file including one or more paragraphs or collections of text. For instance, the term "electronic document" includes digital files with the following, or other, file extensions: .DOC, .DOCX, .PDF, .TXT, .HTML, .RTF, or .ODT.

In some embodiments, the electronic document 104 also includes digital files that have a combination of text and other embedded content (e.g., embedded images, tables, etc.). Accordingly, although much of the description herein is phrased in terms of text paragraphs, it will be appreciated that the disclosure applies to editing other objects that are in-line, wrapped, otherwise embedded into the electronic file. An example of a typographic river is a sequence of three or more consecutive lines of text that each include empty glyphs within a threshold lateral distance. Each empty glyph of the typographic river is described as a node of the typographic river. Additional details of typographic rivers are discussed with regard to FIGS. 2-3.

The electronic document 104 includes a set of typographic parameters that define perceptual aspects to the electronic document. For example, the set of typographic parameters (e.g., glyph spacing, glyph size, etc.) define perceptual aspects of the text at locations in the vicinity of nodes of each typographic river. In some embodiments, locations in the vicinity of nodes include positions on a same page, or within a set of paragraphs or words that include the first node and the final node of the typographic river. In some embodiments, the electronic document 104 includes multiple pages that may have different typographic parameters such as having different fonts on different pages, or in different paragraphs on the same page. In these cases, the text at locations in the vicinity of nodes for each typographic river is the text that is edited to remove nodes of the typographic rivers.

At numeral 2, a river identification engine 106 detects one or more nodes of a typographic river in the electronic document 104. Each node of a typographic river is an empty glyph (e.g., a blank space between characters) on a wax line (e.g., a bounding box that encloses a line of glyphs). The typographic river is identified by searching the wax lines of each line for empty glyphs that occur within a threshold distance. For example, the river identification engine 106 identifies a first empty glyph in a first wax line. The river identification engine 106 identifies a second empty glyph in a second wax line that is within a threshold distance laterally from the first empty glyph. For each consecutive wax line that includes an empty glyph within a threshold distance, the empty glyphs are associated as nodes in a typographic river. In some embodiments, the threshold distance is a configurable portion of the average glyph width. For example, the threshold distance is 10% of the average glyph width. The threshold distance is measured between the center of a bounding box of the first empty glyph and the center of the bounding box of the second empty glyph. In some embodiments, a sequence of three or more empty glyphs within a threshold distance forms a typographic river. Additional details of empty glyphs are described with regards to FIGS. 2-3.

The typographic river identified by the river identification engine 106 includes a sequence of nodes of the river. The sequence of nodes is defined by a position of a first node on a page of the electronic document. Each sequence of nodes can include any number of nodes up to a number equal to the number of lines on a page (e.g., before a page break is detected). The river identification engine 106 assigns an index to each node of the sequence of nodes and an identifier to the river including all nodes in the sequence. For example, the first node of the typographic river receives an index number of 1, the second node receives an index number of 2, and subsequent nodes are indexed accordingly until the final node of the typographic river. The river identification engine 106 represents the typographic river as a vector representation, a matrix representation, or other format.

At numeral 3, a river removal engine 110 eliminates each node in the typographic river by adjusting a set of typographic parameters. The set of typographic parameters is a set of existing hyphenation points and a set of typesetting values that represent perceptual aspects of the text such as a letter spacing, word spacing, and/or glyph scaling. To remove each node, a position of the first node in the typographic river (e.g., represented by a first node of the sequence of nodes at numeral 2) is determined to be on a particular line of the electronic document by the river removal engine 110 using the output of the river identification engine 106. In some embodiments, the node positions can be output from the river identification engine 106 as an index and a line number of the page, of the document, or another location identifier.

In some embodiments, the set of existing hyphenation points are detected by analyzing each line of the electronic document to identify the hyphen character "-" or a single word that is partitioned by a hyphen or other special character. A set of potential hyphenation points is identified using the set of existing hyphenation points. In some embodiments, the set of potential hyphenation points include different locations for the existing hyphenations such as between different characters in the word with the existing hyphenation point.

For example, for an existing hyphenation point in "evaluate," a corresponding potential hyphenation is "evalu-ate." In some embodiments, different words have different limitations on potential hyphenation points that are usable such as at syllable breaks (e.g., "sell-ing," but not "sellin-g"), or between words in a compound word (e.g., "one-way" but not "on-eway"). The potential hyphenation points represent a typographic parameter that can be adjusted by the river removal engine 110.

To remove nodes of the typographic river, the river removal engine 110 checks a line that precedes the line including the first node to determine if the preceding line includes an existing hyphenation point. In some examples, the river removal engine 110 checks line numbers of the line that includes the first node and line numbers with a potential hyphenation point and positioned in the vicinity of the first node (e.g., same page, same paragraph, etc.).

In some embodiments, the line of text preceding the first node includes an existing hyphenation point. The river removal engine 110 analyzes the potential hyphenation points and the resulting changes (e.g., if the hyphen is moved to one of the potential hyphenation points) to the positions of nodes in the typographic river for each potential hyphenation point. By adjusting the existing hyphenation point to one of the potential hyphenation points, the characters after the hyphenation point are displaced to updated positions. In some cases, the resulting change in position of one or more nodes of the typographic river exceeds the threshold distance from the preceding or subsequent node and allows these nodes to be removed from the typographic river.

In other embodiments, after adjusting the hyphenation points, the resulting change in position of one or more nodes of the typographic river is less than the threshold distance from the preceding or subsequent node and the one or more nodes remains in the typographic river. To remove the remaining nodes in the typographic river, the river removal engine 110 adjusts one or more of the typesetting values. For example, the letter spacing, word spacing, and/or glyph scaling are adjusted by 5% to further displace positions of the nodes of the typographic river. The river removal engine 110 compares the adjusted position of each node with the adjusted position of each preceding or subsequent node. The distance between the adjusted position of each node and the adjusted position of the preceding or subsequent node is compared with the threshold distance. If the river removal engine 110 determines the distance between the adjusted position of each node and the adjusted position of the preceding or subsequent node exceeds the threshold distance, the nodes are removed from the typographic river. If the river removal engine 110 determines that three or more nodes remain in the typographic river, the typesetting values are adjusted by an additional amount (e.g., 10% change) and the resulting updated positions of the nodes are compared with the threshold distance between each node. In some embodiments, the river removal engine 110 performs adjustments iteratively adjusting the hyphenation points and the typesetting values until all nodes of the typographic river have been removed.

At numeral 4, the typography management system 102 generates output electronic document 120. For instance, the typography management system 102 incorporates an aggregated set of adjustments made by the river removal engine 110 into an output electronic document 120. The typography management system 102 determines, by applying the river identification engine 106, that the electronic document does not contain any additional typographic rivers. The typography management system 102 provides the output electronic document 120 to the user interface, another computing system, or stores the output electronic document 120.

Optionally, as shown at numeral 5, in some embodiments, the river removal engine 110 stores typography data 114, including hyphenation points, typographic node locations, a number of nodes, typesetting value, and other parameters, for use in subsequent processing. For example, the typography data 114 is used for prioritizing hyphenation points or typesetting value adjustments for particular configurations of typographic rivers, existing hyphenation points, and other factors.

Figure 2:
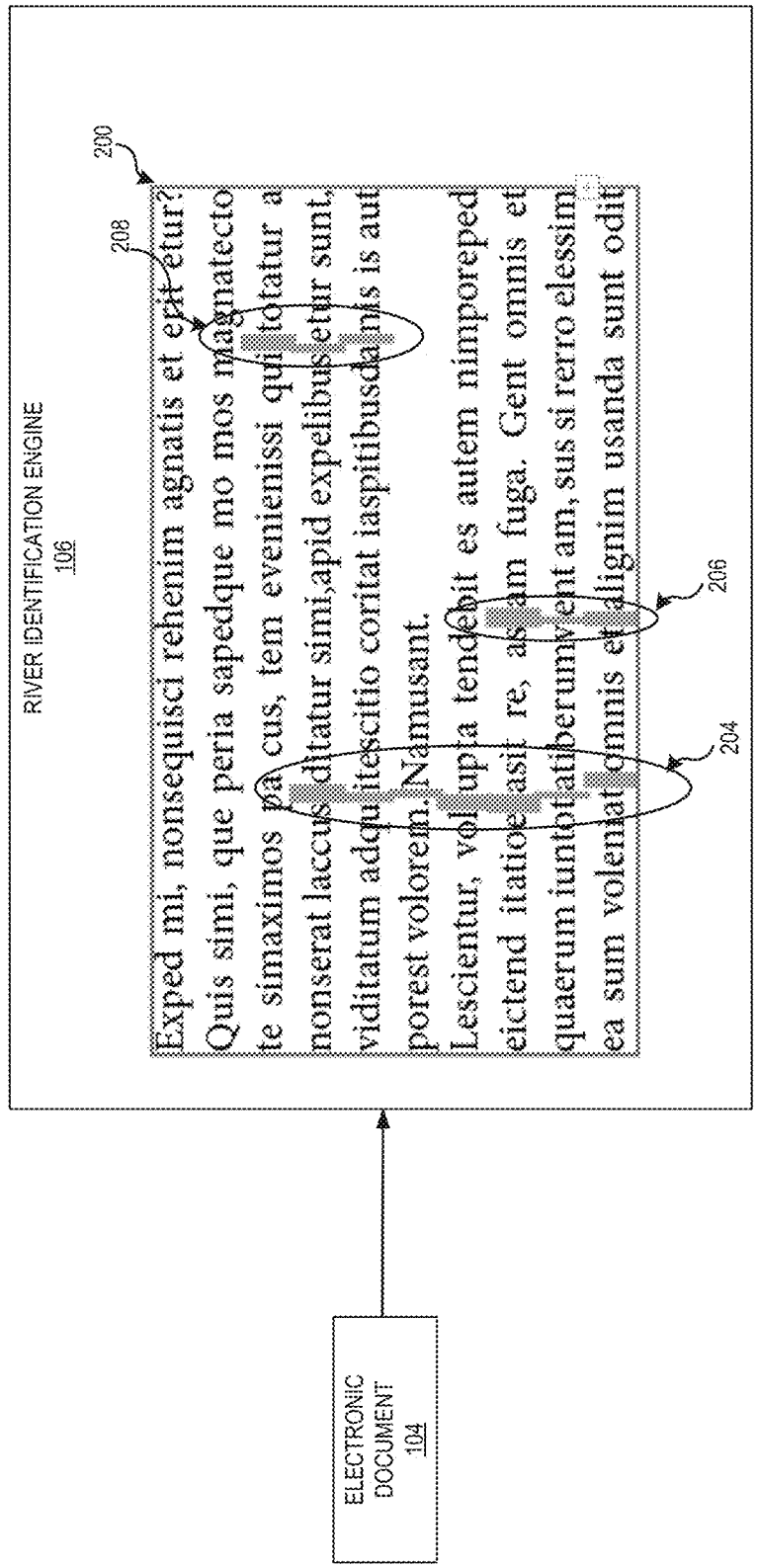
FIG. 2 illustrates a diagram of identifying typographic rivers in an electronic document in accordance with one or more embodiments.

FIG. 2 illustrates a diagram of identifying typographic rivers in an electronic document in accordance with one or more embodiments. As described above, the electronic document 104 includes plurality of words 200. The river identification engine 106 searches the electronic document 104 for empty glyphs that occur on sequential lines and are within a threshold distance of each other. A typographic river is identified when any three empty glyphs occur in a sequence of three lines and each empty glyph is within the threshold distance.

As illustrated in FIG. 2, the river identification engine 106 processes the electronic document 104 and identifies a first typographic river 204, a second typographic river 206, and a third typographic river 208. In some embodiments, the river identification engine 112 can annotate the electronic document (e.g., using a gradient as shown in FIG. 2) to display each of the typographic rivers via the user interface. In the example illustrated by FIG. 2, the first typographic river 204 includes seven nodes, the second typographic river 206 includes three nodes, and the third typographic river 208 includes three nodes.

Figure 3:
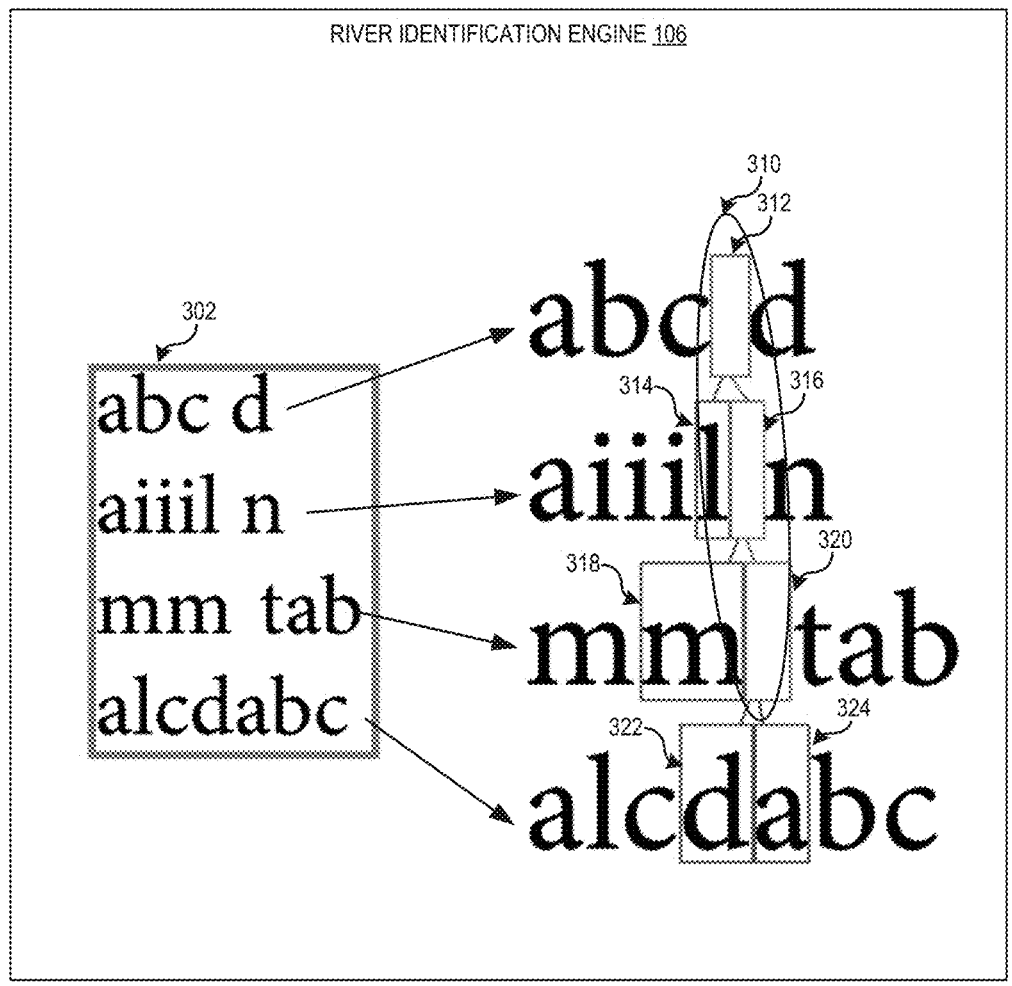
FIG. 3 illustrates a diagram of classifying a set of nodes as a typographic river in the electronic document in accordance with one or more embodiments.

FIG. 3 illustrates a diagram of identifying a set of nodes in a typographic river in the electronic document in accordance with one or more embodiments. The river identification engine 106 analyzes the electronic document 302 and identifies a plurality of empty glyphs forming a typographic river 310. The arrows of FIG. 3 indicate the relationship between lines of text in the electronic document 302 and the expanded lines of text.

A first empty glyph 312 is identified in the first line between the characters "c" and "d." To determine if there is a possible typographic river, the river identification engine 106 searches the line adjacent to the line (e.g., above/below) that includes the first empty glyph. While FIG. 3 is illustrated as a searching down from the first empty glyph, the typographic river can also be identified by searching above and having the first empty glyph at the bottom of the typographic river. Underneath the first empty glyph 312, two glyphs 314 and 316 are within the threshold distance. The glyph 314 includes the character "l" while the glyph 316 is a second empty glyph ("second empty glyph 316). The river identification engine 112 associates the second empty glyph 316 and the first empty glyph 312 as nodes in a potential typographic river. As described above, a typographic river includes three or more nodes. The river identification engine 106 searches the line underneath the second empty glyph 316 to determine if an additional empty glyph is within the threshold distance of the second empty glyph 316. Underneath the second empty glyph 316, a glyph 318 that is a character "m" and a third empty glyph 320 within the threshold distance. Because the series of the first empty glyph 312, the second empty glyph 316, and the third empty glyph 320 together form a typographic river, the river identification engine 106 associates the three nodes with an identifier for a typographic river. The river identification engine 106 continues to search subsequent lines until a final node of the typographic river is identified.

As illustrated by FIG. 3, the river identification searches the line underneath the third empty glyph 320 to determine if an additional empty glyph is within the threshold distance of the third empty glyph 320. Underneath the third empty glyph 320, a glyph 322 that is a character "d" and a glyph 324 that is a character "a" are within the threshold distance. Because no empty glyph is within a threshold distance of the third empty glyph 320, the typographic river has no additional nodes. The river identification engine 112 designates the third empty glyph 320 as the final node of the typographic river.

Figure 4:
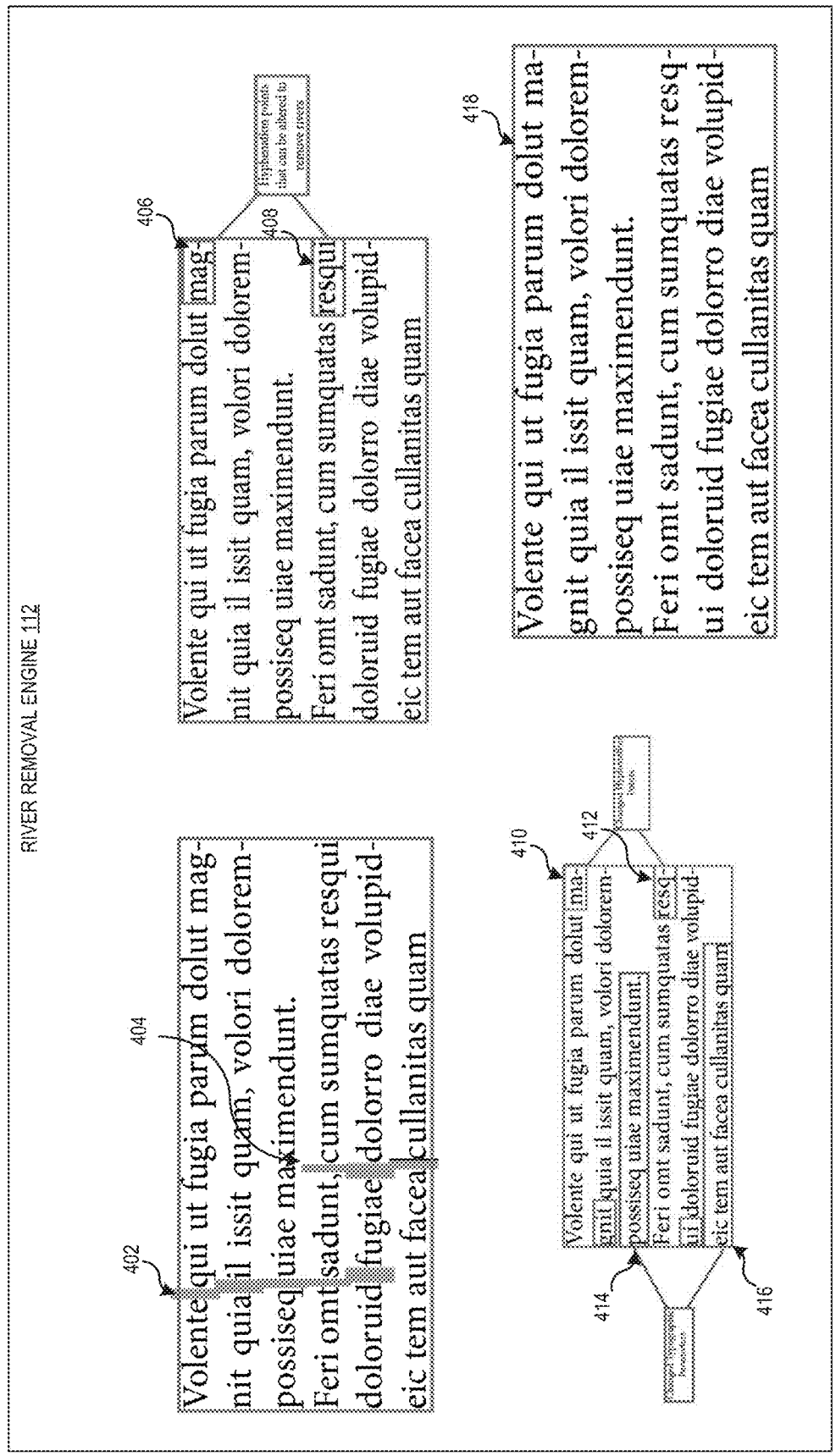
FIG. 4 illustrates a diagram of identifying candidate adjustments and modifying typographic parameters to remove typographic rivers in the electronic document in accordance with one or more embodiments.

FIG. 4 illustrates a diagram of identifying hyphenation points and modifying typographic parameters to remove typographic rivers in the electronic document in accordance with one or more embodiments. As described above, the river identification engine has processed a plurality of words and identified two typographic rivers. A first typographic river 402 includes five nodes and a second typographic river 404 includes three nodes.

As described above with regard to FIG. 1, the river removal engine 110 identifies existing hyphenation points 406 and 408 in the vicinity of the first typographic river 402 and the second typographic river 404. The river removal engine 110 determines a set of typographic parameters in the lines in the vicinity of the first typographic river 402 and the second typographic river 404. To remove the nodes from each typographic river, the river removal engine 110 evaluates potential hyphenation points adjacent to the existing hyphenation points 406 and 408. As illustrated by FIG. 4, the existing hyphenation points represent "mag-nit" and "res-qui." The river removal engine 110 adjusts the hyphenation points 406 and 408 to adjusted hyphenation points 410 and 412. The adjusted hyphenation points are "ma-gnit" and "resq-ui" and adjusting the hyphenation points change the position of one or more nodes of both typographic rivers.

The river removal engine 110 also adjusts typesetting values of lines 414 and 416 to remove nodes of the typographic rivers. For example, the typesetting values can be adjusted individually or as a set. The letter spacing, word spacing, or glyph scaling of the lines 414 and 416 are adjusted by 5% to further displace the positions of each node within the first typographic river 402 and a second typographic river 404. The river removal engine 110 aggregates the changes of hyphenation points and typesetting values to produce the output text 418. As depicted in output text 418, the first typographic river 402 and the second typographic river 404 have been removed. While FIG. 4 illustrates changing both hyphenation points and typesetting values, the hyphenation points and typesetting values can be changed independently. In some embodiments, the adjustment can be optimized within a range (0-5%, 5-10%, etc.) using an optimization process such as a binary search.

Figure 5:
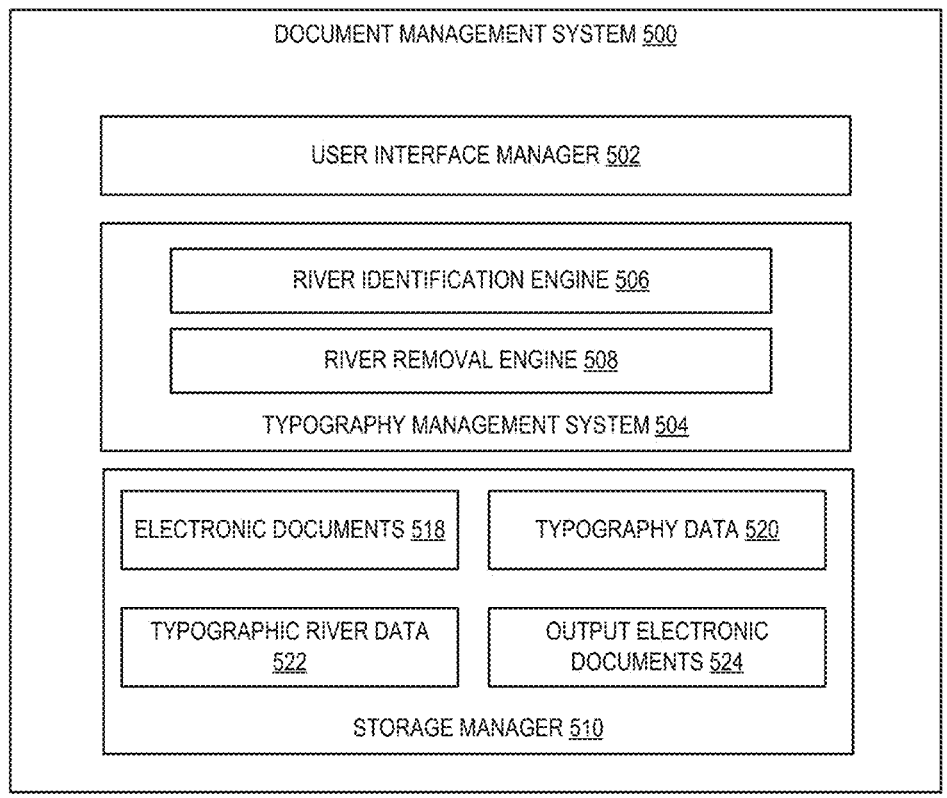
FIG. 5 illustrates a schematic diagram of a document management system in accordance with one or more embodiments.

FIG. 5 illustrates a schematic diagram of document management system 500 (e.g., "document management system 100" described above) in accordance with one or more embodiments. As shown, the document management system 500 may include, but is not limited to, user interface manager 502, typography management system 504, and storage manager 510. The typography management system 504 includes a river identification engine 506, and a river removal engine 508. The storage manager 510 includes electronic documents 518, typography data 520, typographic river data 522, and output electronic documents 524.

As illustrated in FIG. 5, the document management system 500 includes a user interface manager 502. For example, the user interface manager 502 allows users to provide electronic documents to the document management system 500. In some embodiments, the user interface manager 502 provides a user interface through which the user can upload the electronic documents 518 which represent the electronic document to have typographic rivers detected and removed, as discussed above. Alternatively or additionally, the user interface may enable the user to download the electronic document from a local or remote storage location (e.g., by providing an address (e.g., a URL or other endpoint) associated with an electronic document).

Additionally, the user interface manager 502 allows users to request the document management system 500 to identify and remove typographic rivers within the electronic document. For example, where the electronic document includes a plurality of words, the user can request that the document management system automatically identify multiple typographic rivers, candidate adjustments, and automatically apply adjustments to remove one or more nodes of the typographic rivers.

As illustrated in FIG. 5, the document management system 500 includes a typography management system 504. The typography management system 504 can receive an electronic document to identify and remove one or more typographic rivers. For example, as discussed, an electronic document can include one or more typographic rivers within a plurality of words. To detect the typographic rivers in the electronic document, the river identification engine searches for three or more empty glyphs that are in consecutive lines and each within a threshold distance of the preceding or subsequent empty glyph. For each typographic river that is detected, the river removal engine 508 removes each node by applying adjustments to the hyphenation points or the typography parameters. After removal of all typographic rivers from the electronic document, the electronic document can be stored in output electronic documents 524.

As illustrated in FIG. 5, the river identification engine 506 detects one or more nodes of a typographic river in the electronic document 104. Each node is identified by searching for a sequence of empty glyphs that occur in subsequent lines and within a threshold distance between the bounding boxes of each empty glyph. For example, a first empty glyph has a bounding box that is disposed in a first line. In a subsequent line (e.g., the line of text immediately below the line that contains the first empty glyph), the river identification engine 106 identifies a second empty glyph that has a bounding box. A distance is computed between a first point of the bounding box of the first empty glyph and a second point of the bounding box of the second empty glyph. In some embodiments, the number of nodes, the position of nodes, or other information relating to the typographic river can be stored in typographic river data 522.

As illustrated in FIG. 5, the river removal engine 508 eliminates each node in the typographic river by adjusting hyphenation points or the typesetting values in the vicinity of the typographic river. Each node of the typographic river is removed by the river removal engine in sequence from the first node of the typographic river to the final node of the typographic river. A set of adjustments that remove all nodes of the typographic river simultaneously can be computed by the river removal engine 508. When processing electronic documents that include multiple typographic rivers, adjustments can be applied to each river individually or applied as an aggregate set of adjustments that eliminates all of the typographic rivers.

As illustrated in FIG. 5, the document management system 500 also includes the storage manager 510. The storage manager 510 maintains data for the document management system 500. The storage manager 510 can maintain data of any type, size, or kind as necessary to perform the functions of the document management system 500. The storage manager 510, as shown in FIG. 5, includes the electronic documents 518. The electronic documents 518 can include a plurality of words, paragraphs, and other content, as discussed in additional detail above. In particular, in one or more embodiments, the electronic documents 518 include typographic rivers to be removed by the typography management system 504.

As further illustrated in FIG. 5, the storage manager 510 also includes typography data 520. Typography data 520 can include typesetting value information for any of the electronic documents 518. For example, typography data 520 includes a set of initial typesetting values and another set of typesetting values that includes adjustments to the set of initial typesetting values made by the river removal engine 508. The storage manager 510 may also include river data 522. The river data 522 may include a river identifier, a first node location, a final node location, a number of nodes, and other information defining a typographic river in the electronic documents 518. The storage manager 510 may further include output electronic documents 524. The output electronic documents 524 may correspond to electronic documents that have been processed by the typography management system 504 and had any typographic rivers that were previously removed.

Each of the components 502-510 of the document management system 500 and their corresponding elements (as shown in FIG. 5) may be in communication with one another using any suitable communication technologies. It will be recognized that although components 502-510 and their corresponding elements are shown to be separate in FIG. 5, any of components 502-510 and their corresponding elements may be combined into fewer components, such as into a single facility or module, divided into more components, or configured into different components that may serve a particular embodiment.

The components 502-510 and their corresponding elements can comprise software, hardware, or both. For example, the components 502-510 and their corresponding elements can comprise one or more instructions stored on a computer-readable storage medium and executable by processors of one or more computing devices. When executed by the one or more processors, the computer-executable instructions of the document management system 500 can cause a client device and/or a server device to perform the methods described herein. Alternatively, the components 502-510 and their corresponding elements can comprise hardware, such as a special purpose processing device to perform a certain function or group of functions. Additionally, the components 502-510 and their corresponding elements can comprise a combination of computer-executable instructions and hardware.

Furthermore, the components 502-510 of the document management system 500 may, for example, be implemented as one or more stand-alone applications, as one or more modules of an application, as one or more plug-ins, as one or more library functions or functions that may be called by other applications, and/or as a cloud-computing model. Thus, the components 502-510 of the document management system 500 may be implemented as a stand-alone application, such as a desktop or mobile application. Furthermore, the components 502-510 of the document management system 500 may be implemented as one or more web-based applications hosted on a remote server. Alternatively, or additionally, the components of the document management system 500 may be implemented in a suit of mobile device applications or "apps."

Figure 6:
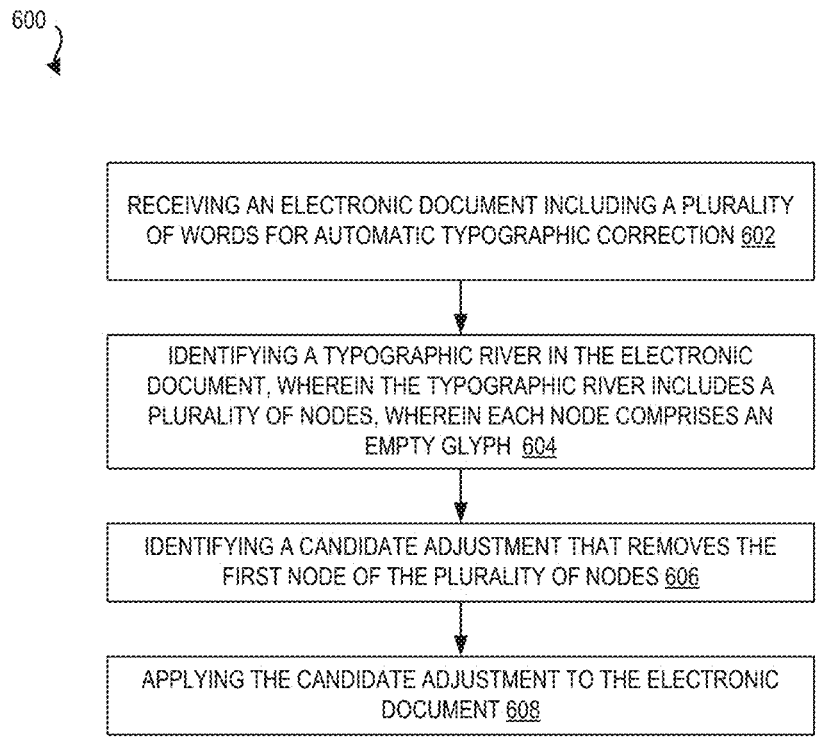
FIG. 6 illustrates a flowchart of a series of acts in a method of detection and removal of typographic rivers in electronic documents in accordance with one or more embodiments.

FIGS. 1-5, the corresponding text, and the examples, provide a number of different systems and devices that allows a user to identify and remove typographic rivers of electronic documents. In addition to the foregoing, embodiments can also be described in terms of flowcharts comprising acts and steps in a method for accomplishing a particular result. For example, FIG. 6 illustrates a flowchart of an exemplary method in accordance with one or more embodiments. The method described in relation to FIG. 6 may be performed with fewer or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart 600 of a series of acts in a method of identifying and removing typographic rivers from electronic documents in accordance with one or more embodiments. In one or more embodiments, the method 600 is performed in a digital medium environment that includes the document management system 500. The method 600 is intended to be illustrative of one or more methods in accordance with the present disclosure and is not intended to limit potential embodiments. Alternative embodiments can include additional, fewer, or different steps than those articulated in FIG. 6.

As illustrated in FIG. 6, the method 600 includes an act 602 of receiving an electronic document including a plurality of words for automatic typographic correction. The electronic document may include a plurality of text paragraphs that include at least one typographic river. The typography management system receives the electronic document from a user, another computing device, or a storage device.

As illustrated in FIG. 6, the method 600 includes an act 604 of identifying a typographic river in the electronic document, wherein the typographic river includes a plurality of nodes wherein each node including an empty glyph. For example, the river identification engine searches the electronic document for sequences of empty glyphs that may form typographic rivers.

A first position of a first empty glyph in a first line of text, a second position of a second empty glyph in a second line of text, and a third position of a third empty glyph in a third line of text are identified by the river identification engine. In some embodiments, the first line of text, the second line of text, and the third line of text are a sequence of adjacent lines of text. Distances are computed between the first position and the second position, and the second position and third position by the river identification engine. The distances are compared to a threshold distance to determine if the positions of the empty glyphs form a typographic river. If each of the distances is less than the threshold distance, the series of the first empty glyph, the second empty glyph, and the third empty glyph are assigned to a typographic river with a river identifier.

As illustrated in FIG. 6, the method 600 includes an act 606 of identifying a candidate adjustment that removes the first node of the plurality of nodes. For example, the river removal engine identifies candidate adjustments by searching the electronic document for existing hyphenation points and detecting typesetting values of text that are located in the vicinity of the first line of text that includes a node of the typographic river. The candidate adjustments include potential alternate positions of the existing hyphenation points and different values of typesetting values.

In some embodiments, the river removal engine identifies a fitting parameter of the first line of text and computes an adjustment factor for typesetting values (e.g., a character spacing, a word spacing, or a glyph scaling for the first line of text). For instance, the fitting parameter may indicate that a line of text being adjusted is underfit and the adjustment factor may increase the typesetting values to increase the character spacing, word spacing, etc. When the fitting parameter indicates that the line of text being adjusted is overfit or fit properly, the adjustment factor may decrease the typesetting values.

As illustrated in FIG. 6, the method 600 includes an act 608 of applying the candidate adjustment to the electronic document. For example, the river removal engine 110 adjusts the positions of the existing hyphenation points, the typesetting values, or a combination thereof.

In some embodiments, the river removal engine adjusts a location of the existing hyphenation point within a word on a line of text that is in the vicinity of the first empty glyph of the typographic river. One of the potential alternate positions for the existing hyphenation points is selected and the hyphen is repositioned with the characters being displaced to updated positions based on the new position of the hyphen. As described regarding FIG. 4, multiple hyphens can be adjusted simultaneously. After adjusting the location of the hyphenation points, the river removal engine comparing a first updated position of the first empty glyph and a second updated position of the second empty glyph to compute an updated distance between the first empty glyph and the second empty glyph. The updated distance is compared with the threshold distance to determine if the updated distance is greater or less than the threshold distance. In an example when the updated distance between two nodes of the typographic river is greater than the threshold distance, the node occurring first in the sequence (e.g., the first node or the node with a lower index) is removed from the typographic river.

In an example when the updated distance between two nodes of the typographic river is less than the threshold distance, the nodes remain in the typographic river and the river removal engine applies adjustments to the typesetting values. In this example, the typography management system determines that one or more nodes remain in the typographic river after applying the candidate adjustment. In these cases, the river identification engine determines an additional candidate adjustment such as further adjusting the typesetting values to remove an additional node of the plurality of nodes.

Figure 7:
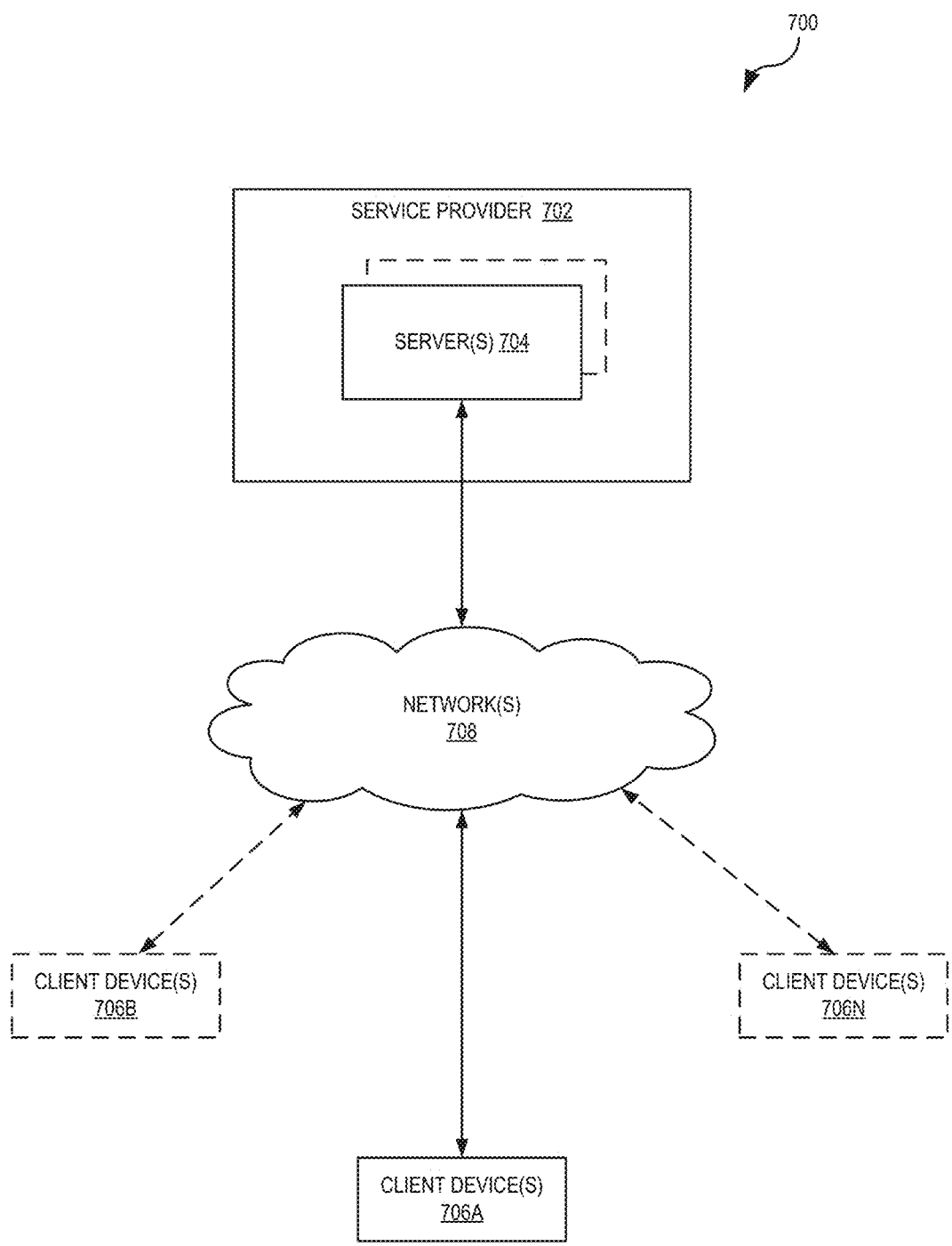
FIG. 7 illustrates a schematic diagram of an exemplary environment in which the document management system can operate in accordance with one or more embodiments.

FIG. 7 illustrates a schematic diagram of an exemplary environment 700 in which the document management system 500 can operate in accordance with one or more embodiments. In one or more embodiments, the environment 700 includes a service provider 702 which may include one or more servers 704 connected to a plurality of client devices 706A-706N via one or more networks 708. The client devices 706A-706N, the one or more networks 708, the service provider 702, and the one or more servers 704 may communicate with each other or other components using any communication platforms and technologies suitable for transporting data and/or communication signals, including any known communication technologies, devices, media, and protocols supportive of remote data communications, examples of which will be described in more detail below with respect to FIG. 8.

Although FIG. 7 illustrates a particular arrangement of the client devices 706A-706N, the one or more networks 708, the service provider 702, and the one or more servers 704, various additional arrangements are possible. For example, the client devices 706A-706N may directly communicate with the one or more servers 704, bypassing the network 708. Or alternatively, the client devices 706A-706N may directly communicate with each other. The service provider 702 may be a public cloud service provider which owns and operates their own infrastructure in one or more data centers and provides this infrastructure to customers and end users on demand to host applications on the one or more servers 704. The servers may include one or more hardware servers (e.g., hosts), each with its own computing resources (e.g., processors, memory, disk space, networking bandwidth, etc.) which may be securely divided between multiple customers, each of which may host their own applications on the one or more servers 704. In some embodiments, the service provider may be a private cloud provider which maintains cloud infrastructure for a single organization. The one or more servers 704 may similarly include one or more hardware servers, each with its own computing resources, which are divided among applications hosted by the one or more servers for use by members of the organization or their customers.

Similarly, although the environment 700 of FIG. 7 is depicted as having various components, the environment 700 may have additional or alternative components. For example, the environment 700 can be implemented on a single computing device with the document management system 500. In particular, the document management system 500 may be implemented in whole or in part on the client device 702A.

As illustrated in FIG. 7, the environment 700 may include client devices 706A-706N. The client devices 706A-706N may comprise any computing device. For example, client devices 706A-706N may comprise one or more personal computers, laptop computers, mobile devices, mobile phones, tablets, special purpose computers, TVs, or other computing devices, including computing devices described below with regard to FIG. 8. Although three client devices are shown in FIG. 7, it will be appreciated that client devices 706A-706N may comprise any number of client devices (greater or smaller than shown).

Moreover, as illustrated in FIG. 7, the client devices 706A-706N and the one or more servers 704 may communicate via one or more networks 708. The one or more networks 708 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 708 may be any suitable network over which the client devices 706A-706N may access service provider 702 and server 704, or vice versa. The one or more networks 708 will be discussed in more detail below with regard to FIG. 8.

In addition, the environment 700 may also include one or more servers 704. The one or more servers 704 may generate, store, receive, and transmit any type of data, including electronic documents 518, typography data 520, river data 522, output electronic documents 524, or other information. For example, a server 704 may receive data from a client device, such as the client device 706A, and send the data to another client device, such as the client device 702B and/or 702N. The server 704 can also transmit electronic messages between one or more users of the environment 700. In one example embodiment, the server 704 is a data server. The server 704 can also comprise a communication server or a web-hosting server. Additional details regarding the server 704 will be discussed below with respect to FIG. 8.

As mentioned, in one or more embodiments, the one or more servers 704 can include or implement at least a portion of the document management system 500. In particular, the document management system 500 can comprise an application running on the one or more servers 704 or a portion of the document management system 500 can be downloaded from the one or more servers 704. For example, the document management system 500 can include a web hosting application that allows the client devices 706A-706N to interact with content hosted at the one or more servers 704. To illustrate, in one or more embodiments of the environment 700, one or more client devices 706A-706N can access a webpage supported by the one or more servers 704. In particular, the client device 706A can run a web application (e.g., a web browser) to allow a user to access, view, and/or interact with a webpage or website hosted at the one or more servers 704.

Upon the client device 706A accessing a webpage or other web application hosted at the one or more servers 704, in one or more embodiments, the one or more servers 704 can provide access to one or more electronic documents (e.g., the electronic documents 518) stored at the one or more servers 704. Moreover, the client device 706A can receive a request (i.e., via user input) to automatically remove typographic rivers from one or more electronic documents and provide the request to the one or more servers 704. Upon receiving the request, the one or more servers 704 can automatically perform the methods and processes described above to identify and remove typographic rivers. The one or more servers 704 can provide all or portions of one or more output electronic documents, to the client device 706A for display to the user.

As just described, the document management system 500 may be implemented in whole, or in part, by the individual elements 702-708 of the environment 700. It will be appreciated that although certain components of the document management system 500 are described in the previous examples with regards to particular elements of the environment 700, various alternative implementations are possible. For instance, in one or more embodiments, the document management system 500 is implemented on any of the client devices 706A-N. Similarly, in one or more embodiments, the document management system 500 may be implemented on the one or more servers 704. Moreover, different components and functions of the document management system 500 may be implemented separately among client devices 706A-706N, the one or more servers 704, and the network 708.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, that both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
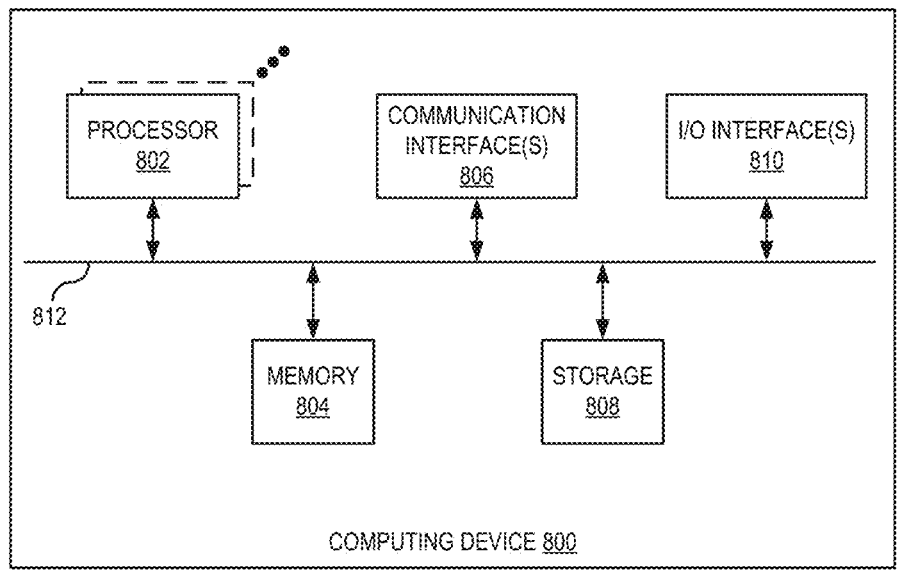
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the document management system. As shown by FIG. 8, the computing device can comprise a processor 802, memory 804, one or more communication interfaces 806, a storage device 808, and one or more I/O devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example, and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 which includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination of these or other storage devices. The computing device 800 also includes one or more input or output ("I/O") devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to display for presentation to a user. The graphical data may be representative of one or more graphical user interfaces and/or any other graphical content that may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving an electronic document including a plurality of words for automatic typographic correction;
   identifying a typographic river in the electronic document based on positions of empty glyphs on consecutive lines of text in the electronic document, wherein the typographic river includes a plurality of nodes, wherein each node comprises an empty glyph;
   identifying a candidate adjustment that removes a first node of the plurality of nodes by:
      searching the electronic document for a hyphenation point that is located in a vicinity of a first line of text; and
      computing, using a fitting parameter for the first line of text, an adjustment factor for a character spacing, a word spacing, or a glyph scaling for the first line of text; and
   applying the candidate adjustment to the electronic document.

2. The method of claim 1, identifying the typographic river in the electronic document comprises:
   identifying a first position of a first empty glyph in a first line of text;
   identifying a second position of a second empty glyph in a second line of text, wherein the second line of text is adjacent to the first line of text;
   identifying a third position of a third empty glyph in a third line of text, wherein the third line of text is adjacent to the second line of text;
   determining that the first position, second position, and third position are within a threshold distance; and
   in response to determining that the first position, second position, and third position are within a threshold distance, classifying the first position, second position, and third position as nodes in the typographic river.

3. The method of claim 2, wherein applying the candidate adjustment to the electronic document comprises:
   adjusting a location of the hyphenation point within a word in the vicinity of the first empty glyph;
   in response to adjusting the location of the hyphenation point, comparing a first updated position of the first empty glyph and a second updated position of the second empty glyph;
   determining a distance between the first updated position and the second updated position is greater than a threshold; and
   removing the node of the typographic river associated with the first empty glyph.

4. The method of claim 1, further comprising:
   determining an additional candidate adjustment, wherein the additional candidate adjustment removes an additional node of the plurality of nodes; and
   applying the additional candidate adjustment to the electronic document.

5. The method of claim 4, further comprising:
   searching the electronic document for an additional typographic river;
   identifying an additional candidate adjustment; and
   removing the additional typographic river by applying the additional candidate adjustment.

6. The method of claim 1, wherein candidate adjustment is a change in a hyphenation point or a change in a typesetting value.

7. A non-transitory computer-readable medium storing executable instructions, which when executed by a processing device, cause the processing device to perform operations comprising:
   receiving an electronic document including a plurality of words for automatic typographic correction;
   identifying a typographic river in the electronic document based on positions of empty glyphs on consecutive lines of text in the electronic document, wherein the typographic river includes a plurality of nodes, wherein each node comprises an empty glyph;
   identifying a candidate adjustment that removes a first node of the plurality of nodes by:
      searching the electronic document for a hyphenation point that is located in a vicinity of a first line of text; and
      computing, using a fitting parameter for the first line of text, an adjustment factor for a character spacing, a word spacing, or a glyph scaling for the first line of text; and
   applying the candidate adjustment to the electronic document.

8. The non-transitory computer-readable medium of claim 7, the operation of identifying the typographic river in the electronic document causing the processing device to perform operations comprising:
   identifying a first position of a first empty glyph in a first line of text;
   identifying a second position of a second empty glyph in a second line of text, wherein the second line of text is adjacent to the first line of text;
   identifying a third position of a third empty glyph in a third line of text, wherein the third line of text is adjacent to the second line of text;
   determining that the first position, second position, and third position are within a threshold distance; and
   in response to determining that the first position, second position, and third position are within a threshold distance, classifying the first position, second position, and third position as nodes in the typographic river.

9. The non-transitory computer-readable medium of claim 8, the operation of applying the candidate adjustment to the electronic document causing the processing device to perform operations comprising:
   adjusting a location of the hyphenation point within a word in the vicinity of the first line of text that includes the first empty glyph of the typographic river;
   in response to adjusting the location of the hyphenation point, comparing a first updated position of the first empty glyph and a second updated position of the second empty glyph;
   determining a distance between the first updated position and the second updated position is greater than a threshold; and
   removing the node of the typographic river associated with the first empty glyph.

10. The non-transitory computer-readable medium of claim 7, the operations further comprising:
    determining an additional candidate adjustment, wherein the additional candidate adjustment removes an additional node of the plurality of nodes; and applying the additional candidate adjustment to the electronic document.

11. The non-transitory computer-readable medium of claim 10, the operations further comprising:
searching the electronic document for an additional typographic river;
identifying an additional candidate adjustment; and
removing the additional typographic river by applying the additional candidate adjustment.

12. The non-transitory computer-readable medium of claim 7, wherein candidate adjustment is a change in a hyphenation point or a change in a typesetting value.

13. A system comprising:
a memory component; and
a processing device coupled to the memory component, the processing device to perform operations comprising:
receiving an electronic document including a plurality of words for automatic typographic correction;
detecting a typographic river, the detecting comprising:
identifying a first position of a first empty glyph in a first line of text;
identifying a second position of a second empty glyph in a second line of text;
identifying a third position of a third empty glyph in a third line of text;
comparing a first distance between the first position and the second position with a threshold distance;
comparing a second distance between the second position and the third position with the threshold distance; and
in response to determining that the first distance and the second distance are less than the threshold distance, identifying the first empty glyph, second empty glyph, and third empty glyph as nodes in the typographic river;
identifying a candidate adjustment that increases the first distance or the second distance to a distance that is greater than the threshold distance by computing, using a fitting parameter, an adjustment factor for a character spacing, a word spacing, or a glyph scaling for the first line of text, wherein the first line of text includes a hyphenation point; and
applying the candidate adjustment to the electronic document.

14. The system of claim 13, wherein the operation of applying the candidate adjustment to the electronic document comprises performing operations comprising:
adjusting a location of the hyphenation point within a word on the first line of text that includes the first empty glyph of the typographic river;
in response to adjusting the location of the hyphenation point, comparing a first updated position of the first empty glyph and a second updated position of the second empty glyph;
determining a distance between the first updated position and the second updated position is greater than a threshold; and
removing the node of the typographic river associated with the first empty glyph.

15. The system of claim 13, the operations further comprising:
determining an additional candidate adjustment, wherein the additional candidate adjustment removes an additional node of the typographic river; and
applying the additional candidate adjustment to the electronic document.

16. The system of claim 13, the operations further comprising:
searching the electronic document for an additional typographic river;
identifying an additional candidate adjustment; and
removing the additional typographic river by applying the additional candidate adjustment.

17. The system of claim 13, wherein candidate adjustment is a change in a hyphenation point or a change in a typesetting value.

* * * * *